United States Patent
Hsiao et al.

(10) Patent No.: US 6,176,353 B1
(45) Date of Patent: Jan. 23, 2001

(54) AUDIBLE HYDRAULIC BRAKE ALARM

(76) Inventors: Rui-Yang Hsiao, No. 265, Sec. 3, Huanho S. Rd., Taipei; Ping-Hui Hsiao, No. 71-1, An Hsi Li, Chia Li Chen, Tainan Hsien, both of (TW)

( * ) Notice: Under 35 U.S.C. 154(b), the term of this patent shall be extended for 0 days.

(21) Appl. No.: 09/213,274

(22) Filed: Dec. 17, 1998

(51) Int. Cl.[7] .................................................. F16D 66/00
(52) U.S. Cl. .......................................... 188/1.11 L; 340/479
(58) Field of Search ........................ 188/1.11 R, 1.11 W, 188/1.11 L, 1.11 E; 116/307, DIG. 161; 340/467, 479, 463, 466, 474; 362/61, 80, 83.3, 802

(56) References Cited

U.S. PATENT DOCUMENTS

| | | | |
|---|---|---|---|
| 4,918,424 | * 4/1990 | Sykora | 340/464 |
| 5,358,075 | * 10/1994 | Jarzombek | 188/1.11 |
| 5,791,441 | * 8/1998 | Matos | 188/1.11 L |
| 5,967,266 | * 10/1999 | Carnegie | 188/1.11 L |

* cited by examiner

Primary Examiner—Christopher P. Schwartz
Assistant Examiner—C. T. Bartz
(74) Attorney, Agent, or Firm—Rosenberg, Klein & Lee

(57) ABSTRACT

An audible hydraulic brake alarm provides a switch electrically connected with a buzzer. The switch has an extensible rod received therein and engaged with a lever of the brake. When the brake has a problem that requires the lever to be pressed a distance over a safe valve, the rod will separate from the lever to activate the buzzer. Thereby the buzzer sounds to warn the driver.

1 Claim, 9 Drawing Sheets

AUDIBLE HYDRAULIC BRAKE ALARM

BACKGROUND OF THE INVENTION

1. Field of the Invention

The present invention relates to a hydraulic brake alarm, and more particularly to a hydraulic brake alarm which will warn the driver that the brake shoe has a fault or is worn excessively.

2. Description of Related Art

A conventional brake assembly is shown in FIGS. 7–9. Referring to these drawings, a brake (20) has a reservoir (21) containing brake fluid to function as the means of transmitting the force applied to the brake pedal (310) to the master cylinder in the brake. A lever (31), which has a pedal (310) on an end thereof, is pivotally mounted on a frame (30). A driving bar (32) is mounted on the bottom of the lever (31) and coupled with the brake (20). A plate (33) is formed on a side of the lever (31). A switch (40) having an extensible rod (41) received therein is disposed on the frame (30) and is above the lever (31). The switch (40) is electrically connected with brake warning-lights (not shown) of a vehicle. Normally, when the brake (20) is not in use, the plate (33) holds the rod (41) in the switch (40).

When a driver presses the pedal (310) to slow or stop the vehicle, the plate (33) will move downwards. Therefore, the rod (41) will extend out to turn the switch (40) "ON" when the plate (33) separates from the rod (41) that follows the downward movement of the pedal (310), so that the brake warning lights are lit.

However, if the reservoir (21) has a leak or the brake shoes have been worn excessively, the driver must press the pedal (310) harder so as to move the lever (31) farther to achieve the desired result. In this case, it is required to examine and the brake (20) and reservoir (21) and take appropriate remedial action. Because drivers generally ignore brake maintenance because of a lack of knowledge or time or possibly because of laziness, the brake (20) will be damaged more and more until the brake (20) completely fails.

There are still ways of providing warning signals to drivers, such as two indicating lamps provided in the dashboard of the vehicle, wherein a first indicating lamp shows the fluid level in the reservoir (21), and a second indicating lamp shows the state of the brake shoe. When there is a fluid leak, the first indicating lamp will be lit. When the brake shoe is worn excessively, the second indicating lamp will be lit. Although the indicating lamps can show states of the reservoir and the brake shoes, it is difficult for the driver to look at the dashboard while driving, so that any fault in the brake assembly may not be noticed.

Therefore, the present invention provides an audible hydraulic brake alarm, which can warn the driver that the brake has a fault, to mitigate and/or obviate the aforementioned problems.

SUMMARY OF THE INVENTION

The main object of the present invention is to provide an audible hydraulic brake alarm which can detect a fault in the brake and warn the driver to ensure safety of driving.

Other objects, advantages and novel features of the invention will become more apparent from the following detailed description when taken in conjunction with the accompanying drawings.

DETAILED DESCRIPTION OF THE PREFERRED EMBODIMENT

Figure 1:
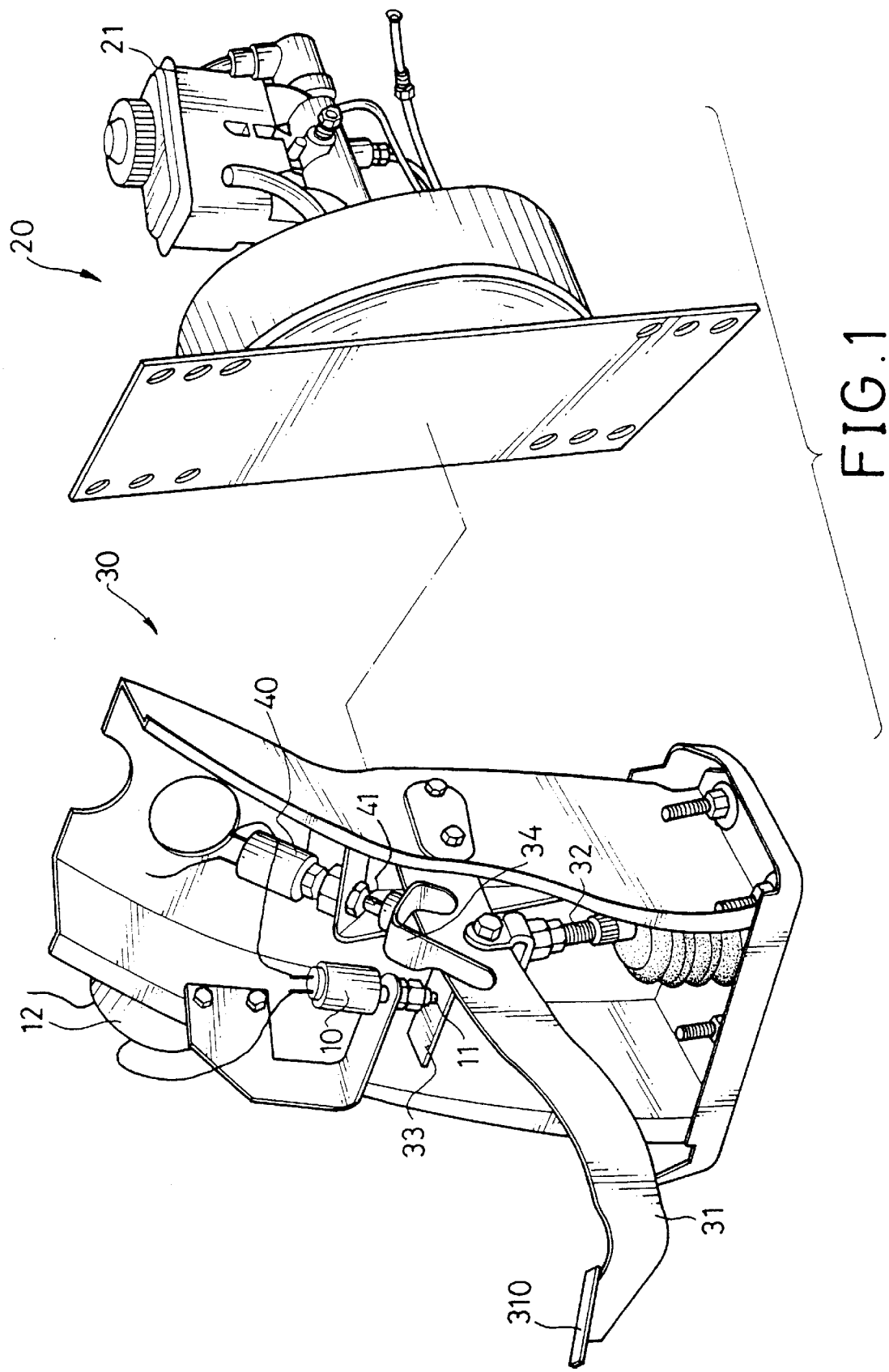
FIG. 1 is a perspective view of a first preferred exemplary embodiment the present invention.
Figure 2:
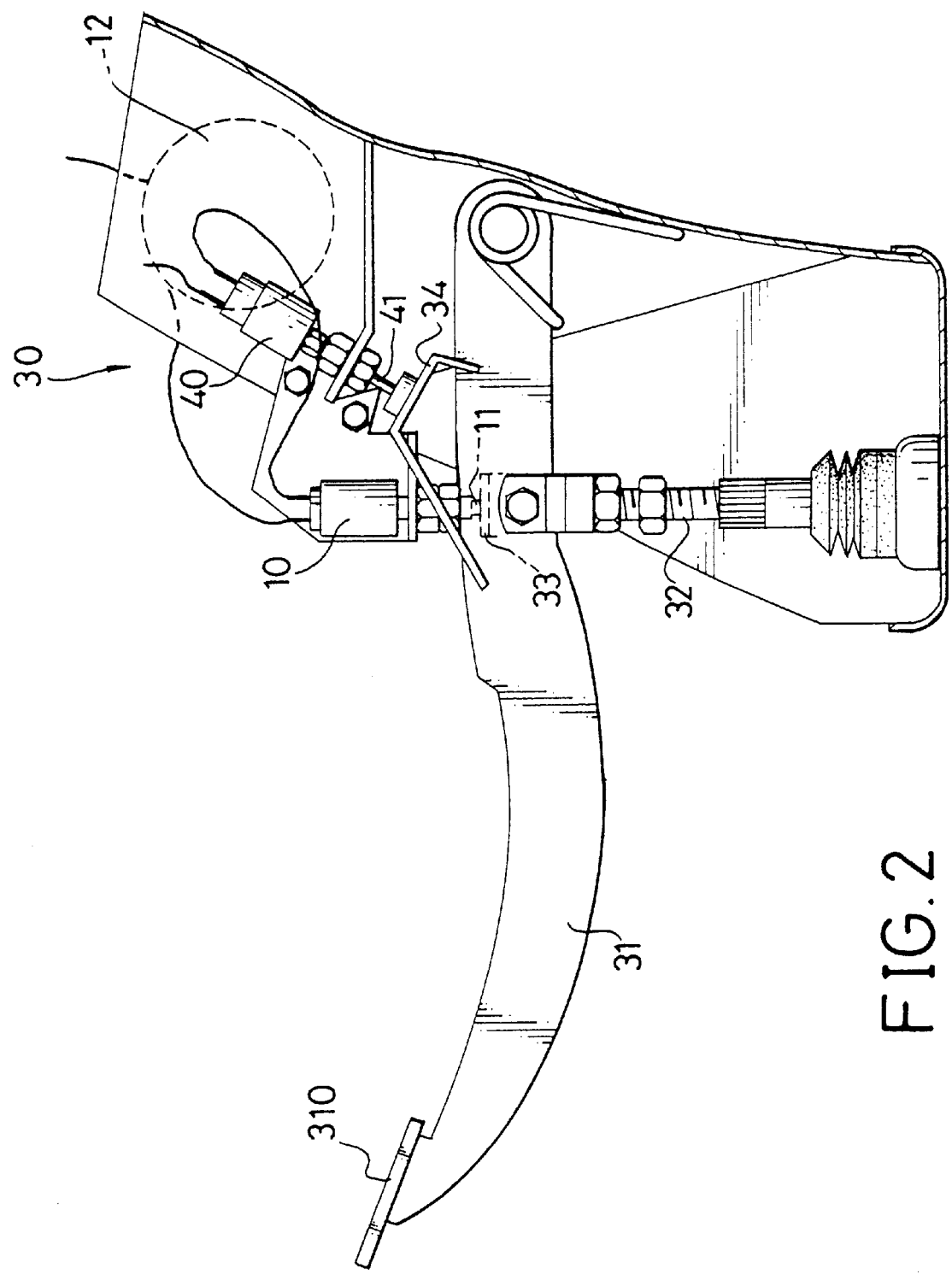
FIG. 2 is a side view of the first preferred exemplary embodiment, wherein the lever is not pressed.

Referring to FIGS. 1 and 2, the main structure of the brake of the present invention is similar to a conventional one. A hydraulic brake (20) has a reservoir (21) mounted thereon. One end of the lever (31) is pivotally mounted on a frame (30). The other end of the lever (31) has a pedal (310) disposed thereon. A driving bar (32) is mounted on the bottom of the lever (31) and coupled with the brake (20). A first switch (40) having a first extensible rod (41) received therein is disposed above the lever (31). An fork member (34) is mounted on the lever (31) to engage with the rod (41). The first switch (40) is electrically connected with the brake lamps (not shown).

A second switch (10) having a second extensible rod (11) received therein is also disposed above the lever (31) but is located on the other side of the lever (31). The length of the second rod (11) is greater than that of the first rod (41). A plate (33) is formed on the lever (31) to engage the rod (11). The second switch (10) is electrically connected with a buzzer (12) which is mounted on the outside of the frame (30).

When the brake (20) is not actuated, the first rod (41) and the second rod (11) respectively hold in the first and second switches (40, 10), so the brake lamp is not lighted and the buzzer (12) is not sounded.

Figure 3:
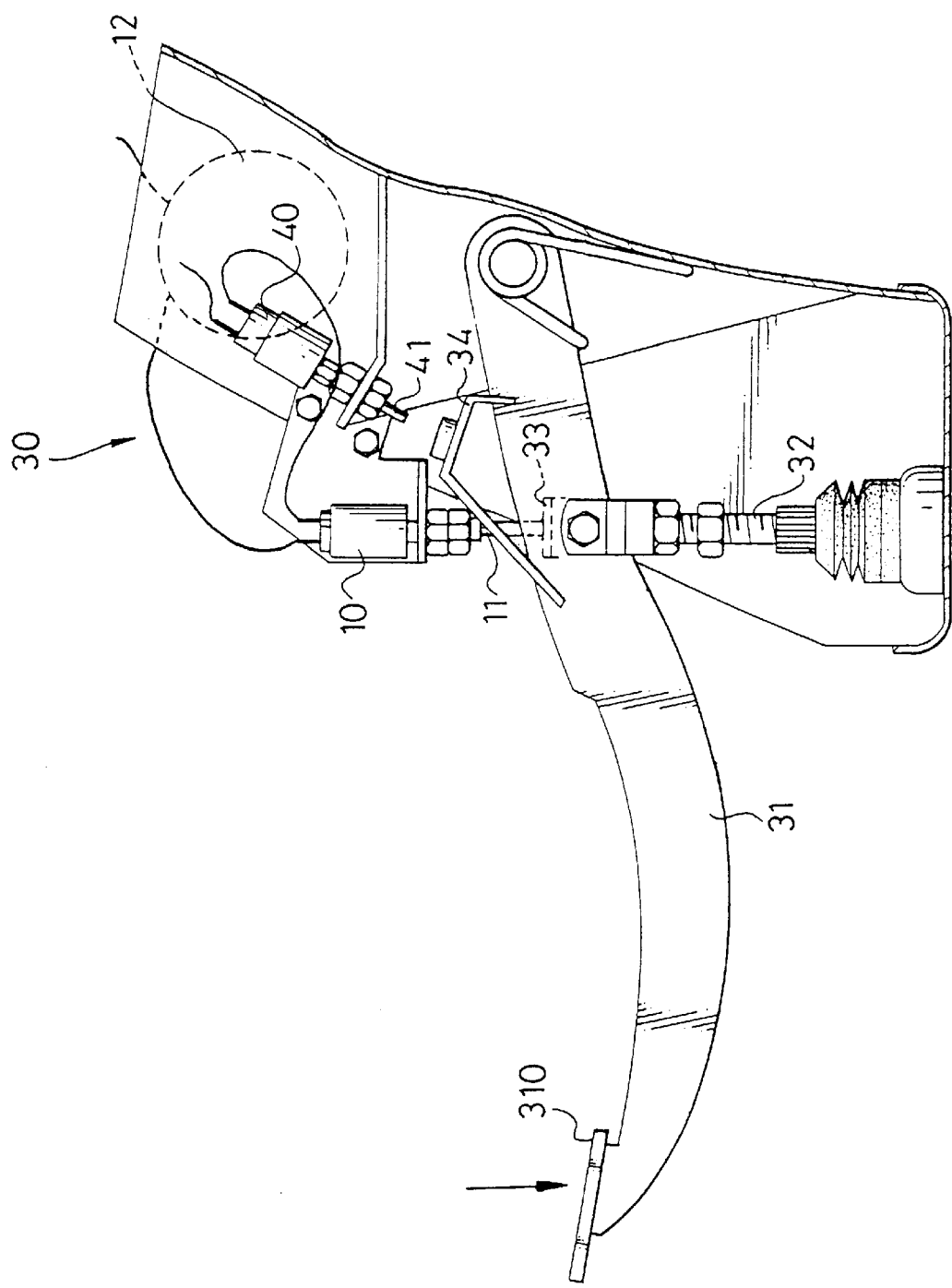
FIG. 3 is a side view of the first preferred exemplary embodiment, wherein the lever is pressed in a normal status.

When the driver presses the brake (20), the lever (31) will pivotally moved downwards, as shown in FIG. 3. The fork member (34) is separated from the rod (41), so the first rod (41) extends downward to turn the first switch (40) "ON". Therefore, the brake lamp will be lighted. Although the plate (33) is also moved downwards along with the fork member (34), the second rod (41) will not be separate from the plate (33) because of its length. Then, the buzzer (12) will not sounded in the normal state.

Figure 4:
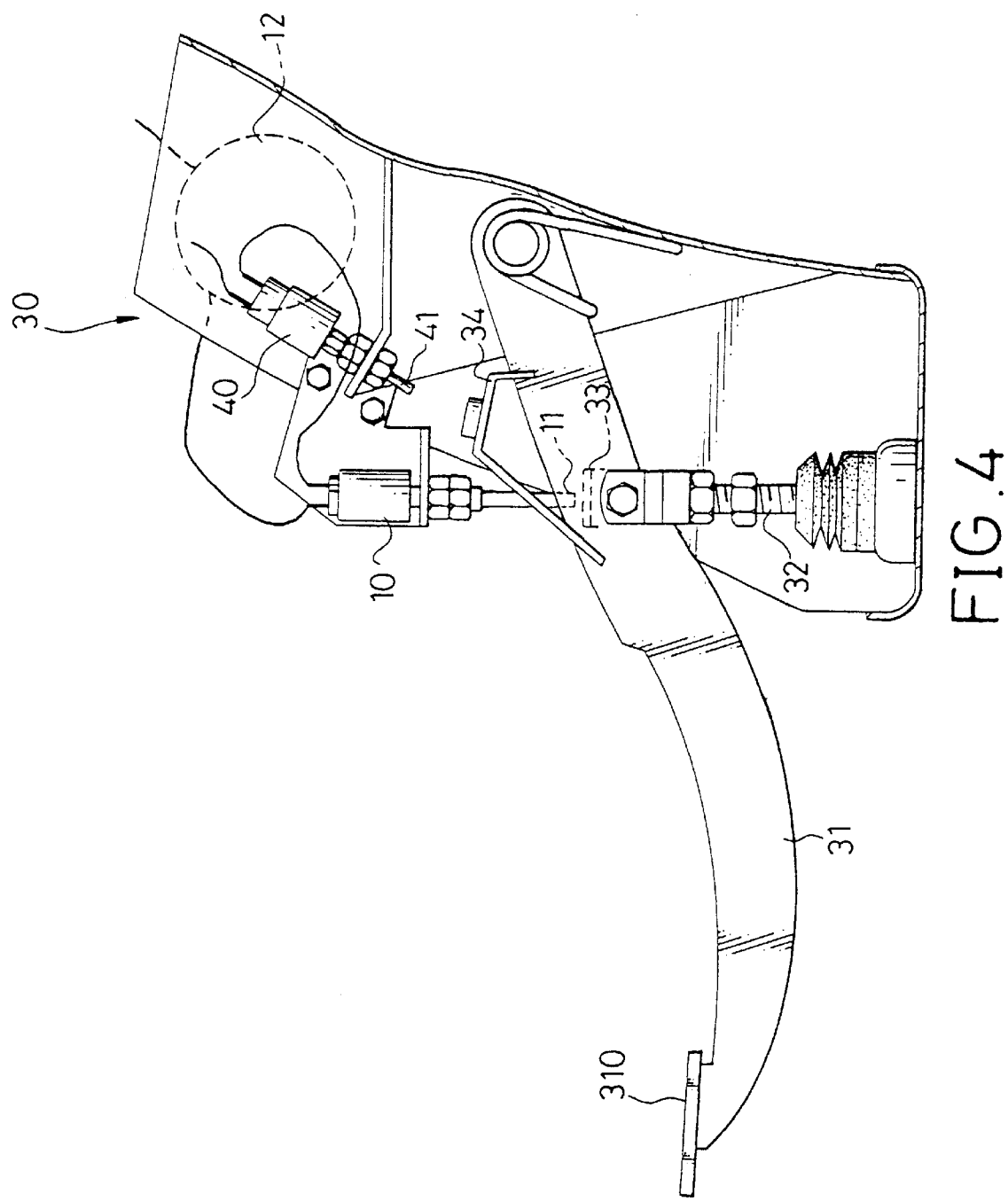
FIG. 4 is a side view of the first preferred exemplary embodiment, wherein the lever is pressed an excess distance.

If the brake incurs a fluid leak or has worn excessively, the lever (31) must move a longer distance to stop the vehicle, as shown in FIG. 4. When the distance the pedal (310) travels is beyond a safe limit value, the second rod (11) will leave from the plate (33) and fully extends to turn the second switch (10) "ON". Thereby, the buzzer (12) will sound an alarm to warn the driver the brake has a problem.

Figure 5:
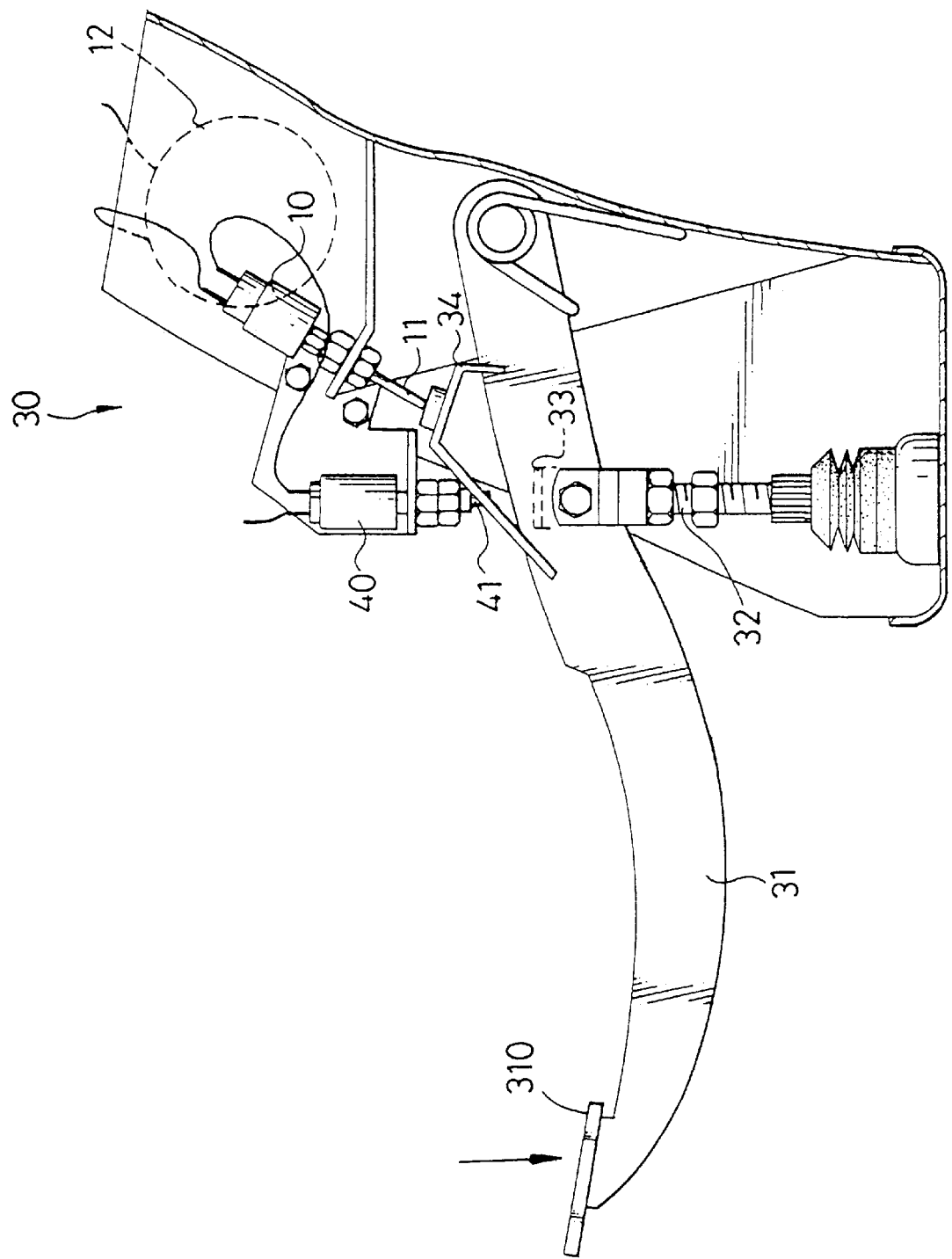
FIG. 5 is a side view of a second preferred exemplary embodiment, wherein the lever is not pressed.
Figure 6:
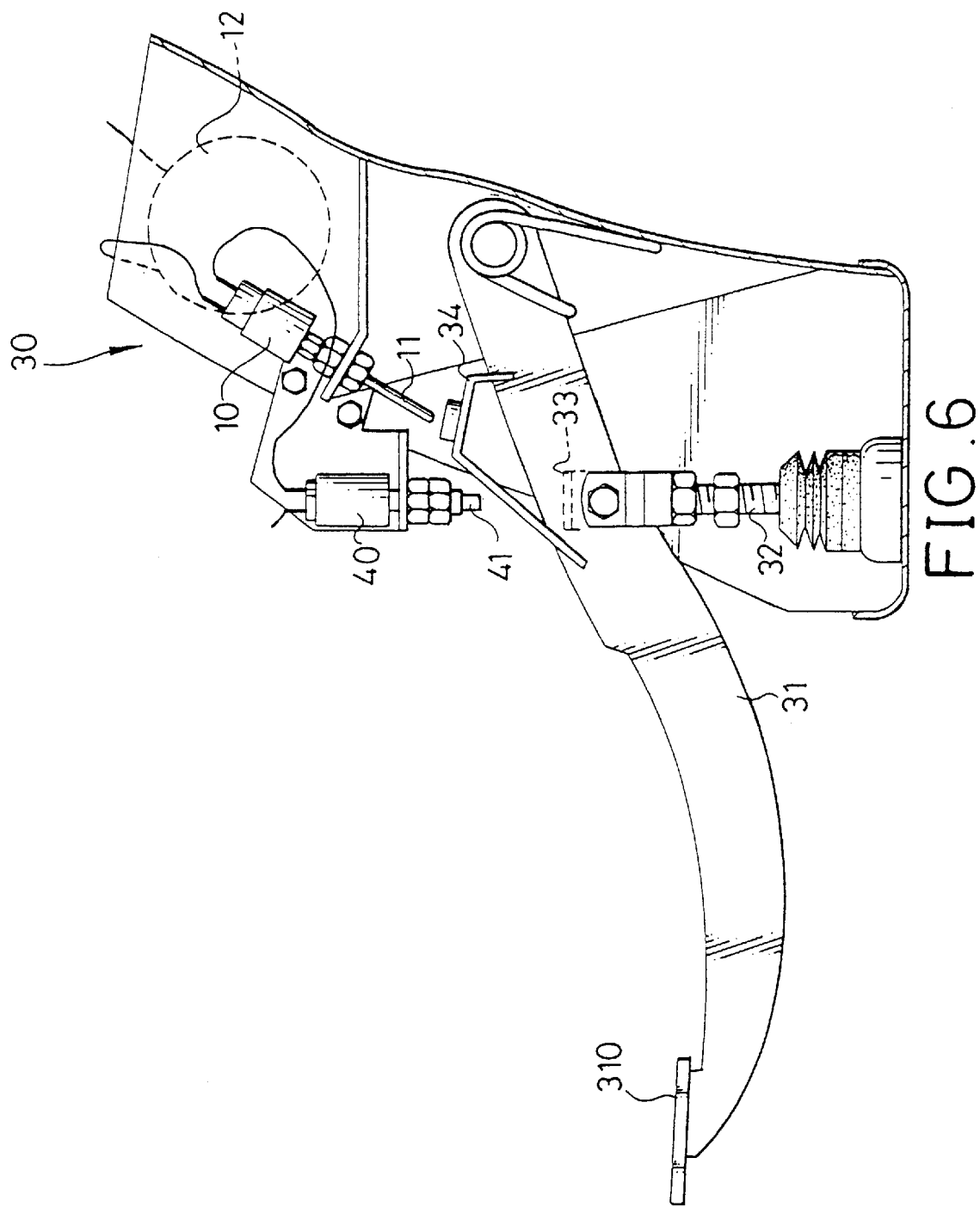
FIG. 6 is a side view of the second preferred exemplary embodiment shown in FIG. 5, wherein the lever is pressed an excess distance.
Figure 7:
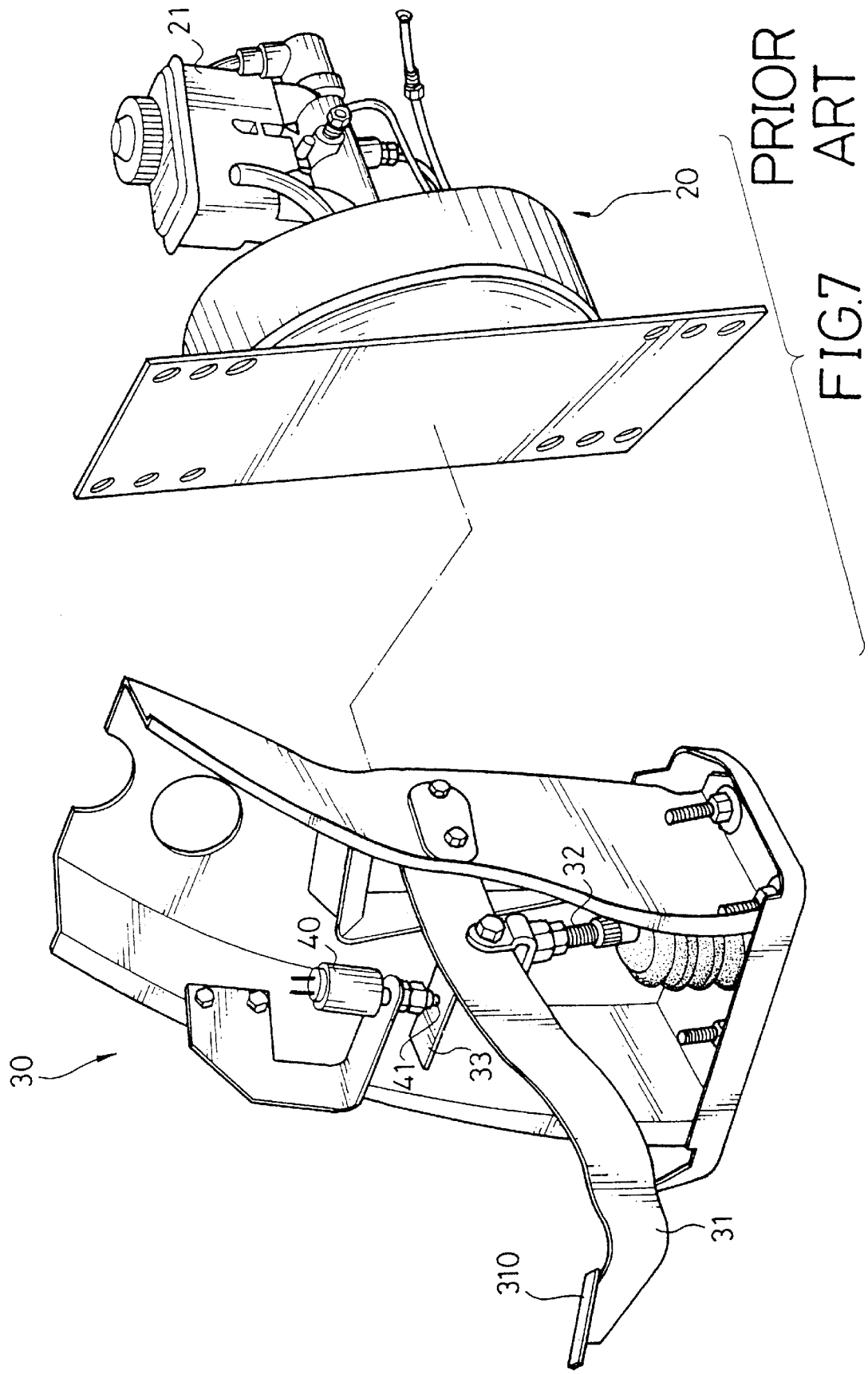
FIG. 7 is a perspective view of a conventional brake.
Figure 8:
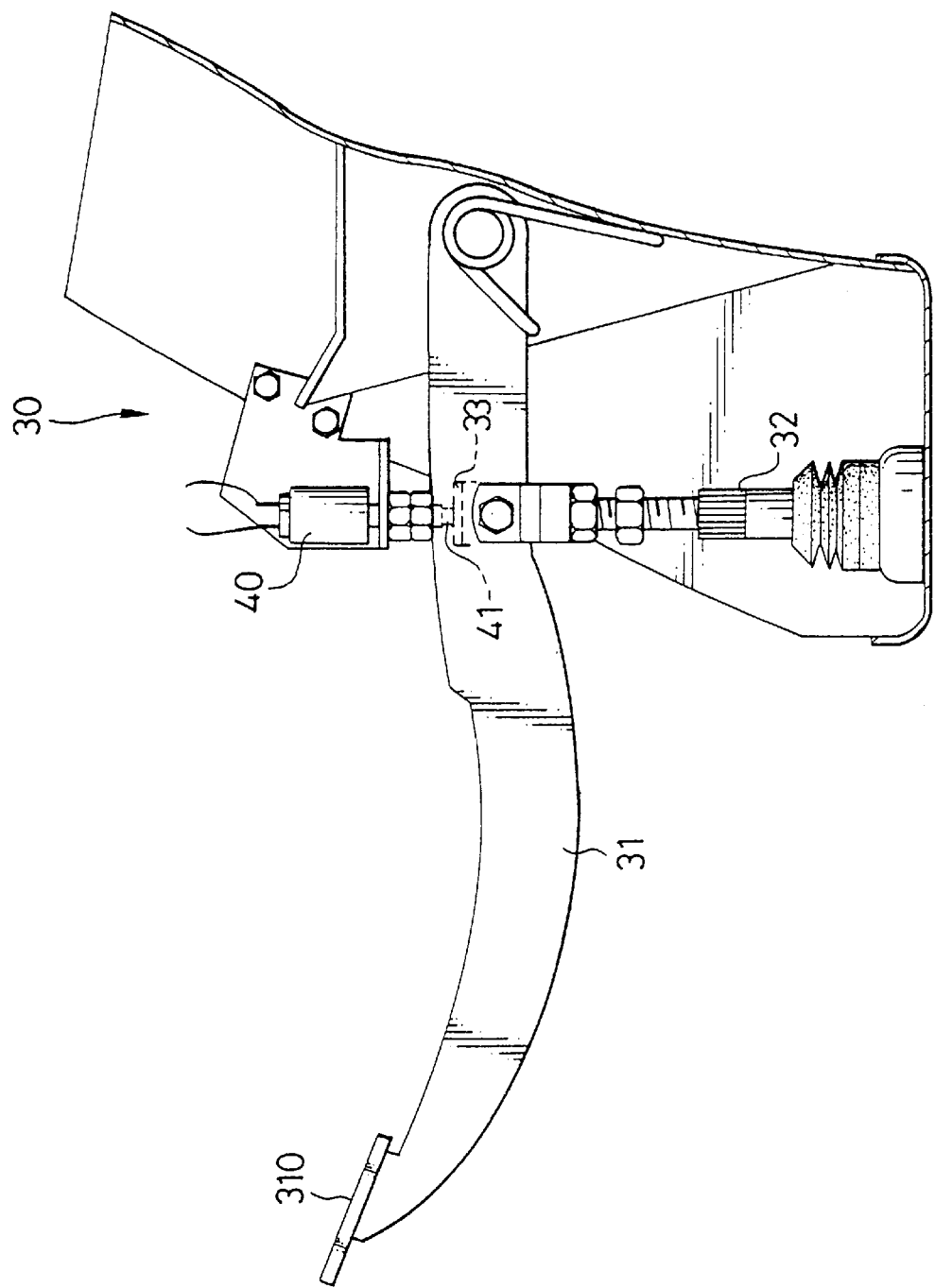
FIG. 8 is a side view of the conventional hydraulic brake, wherein the lever is not pressed.
Figure 9:
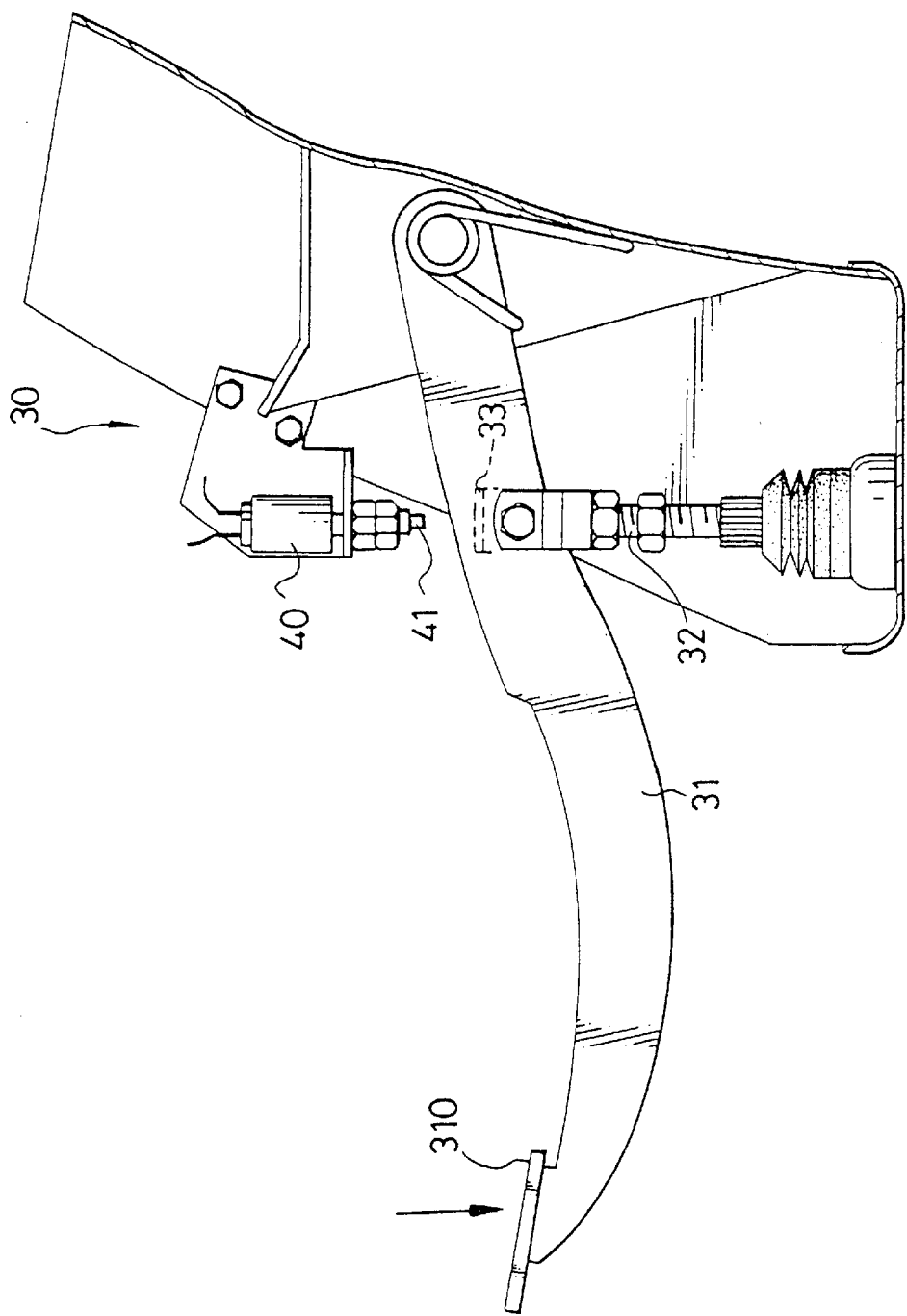
FIG. 9 is a side view of the conventional hydraulic brake, wherein the lever is pressed.

In another exemplary embodiment shown in FIGS. 5–6, the switch (40) having the first rod (41) is disposed above the plate (33) and electrically connected to the brake lamps, the switch (10) having the second rod (11) is disposed above the fork member (34) and electrically connected to the buzzer (12). By this design, the present invention can accomplish the same effect. Manufacturers or consumers can choose a suitable configuration of the present invention based on the vehicle structure.

It is to be understood, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An audible hydraulic brake alarm comprising:

a lever pivotally mounted on a frame, and having a plate and a fork member;

a driving bar mounted under the lever and adapted to activate a brake; and two switches respectively disposed above the lever, wherein one switch having a first extensible rod received therein is electrically connected with the brake lights, and another switch having a second extensible rod movably received therein is electrically connected with a buzzer, and the length of the second extensive rod being greater than that of the first extensive rod, wherein the plate and fork members respectively actuate the first rod and the second rod of the two switches.

* * * * *